United States Patent
Ganzel

(10) Patent No.: US 7,967,393 B2
(45) Date of Patent: Jun. 28, 2011

(54) PRESSURE BALANCED SUPPLY VALVE FOR VEHICLE BRAKE SYSTEM WITH INTEGRATED LOW PRESSURE ACCUMULATOR

(75) Inventor: Blaise J. Ganzel, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 840 days.

(21) Appl. No.: 11/664,341

(22) PCT Filed: Oct. 4, 2005

(86) PCT No.: PCT/US2005/035838
§ 371 (c)(1),
(2), (4) Date: Jan. 10, 2008

(87) PCT Pub. No.: WO2006/041925
PCT Pub. Date: Apr. 20, 2006

(65) Prior Publication Data
US 2008/0136250 A1  Jun. 12, 2008

Related U.S. Application Data

(60) Provisional application No. 60/616,081, filed on Oct. 4, 2004.

(51) Int. Cl.
*B60T 13/16* (2006.01)
(52) U.S. Cl. ........ 303/10; 303/113.2; 303/901; 137/112
(58) Field of Classification Search ............ 303/10, 303/84.2, 113.2, 901, DIG. 1, DIG. 2; 137/112, 137/854
See application file for complete search history.

(56) References Cited

U.S. PATENT DOCUMENTS

| 4,789,208 | A | | 12/1988 | Kohno |
| 5,390,994 | A | | 2/1995 | Jonner et al. |
| 5,405,191 | A | | 4/1995 | Nishiyama et al. |
| 5,590,936 | A | | 1/1997 | Reuter |
| 5,741,049 | A | * | 4/1998 | Sorensen .......... 303/9.75 |
| 5,882,090 | A | | 3/1999 | Ganzel |
| 5,884,985 | A | | 3/1999 | Ganzel et al. |
| 6,022,085 | A | | 2/2000 | Ganzel et al. |
| 6,024,424 | A | | 2/2000 | Nakazawa et al. |
| 6,238,019 | B1 | | 5/2001 | Okazaki et al. |
| 6,446,435 | B1 | | 9/2002 | Willmann et al. |

FOREIGN PATENT DOCUMENTS

| DE | 100 47 961 A1 | 4/2001 |
| JP | 2001-97202 | 4/2001 |
| WO | WO 94/27848 | 12/1994 |
| WO | WO 98/26966 | 6/1998 |

* cited by examiner

*Primary Examiner* — Pam Rodriguez
(74) *Attorney, Agent, or Firm* — MacMillan, Sobanski & Todd, LLC

(57) ABSTRACT

A pressure balanced supply valve for use in a vehicular braking system. A housing defines a first chamber, a second chamber, a first fluid conduit for connection to a master cylinder, a second fluid conduit for connection to a hydraulic pump, and a third fluid conduit connected between the first and second fluid conduits. The second fluid conduit communicates with both the first chamber and the second chamber. A valve seat is defined in the third fluid conduit. A movable valve element is movable to a first position sealing against the valve seat to prevent fluid flow between the first and second conduits through the third conduit, and to a second position permitting fluid flow between the first and second conduit through the third conduit. The movable valve element is exposed to pressures in both the first and second chambers so as to be pressure balanced in operation.

14 Claims, 3 Drawing Sheets

PRESSURE BALANCED SUPPLY VALVE FOR VEHICLE BRAKE SYSTEM WITH INTEGRATED LOW PRESSURE ACCUMULATOR

CROSS-REFERENCE TO RELATED APPLICATIONS

This application is a national stage of International Application No. PCT/US2005/035838 filed Oct. 4, 2005, the disclosures of which are incorporated herein by reference, and which claimed priority to U.S. Provisional Patent Application No. 60/616,081 filed Oct. 4, 2004, the disclosures of which are incorporated herein by reference.

BACKGROUND OF THE INVENTION

This invention relates in general to vehicular braking systems, and in particular a supply valve for use in an anti-lock braking system (ABS) including traction control (TC).

Vehicles are commonly slowed and stopped with hydraulic braking systems. These systems vary in complexity, but a base brake system typically includes a tandem master cylinder, pressure fluid conduit arranged in two similar but separate brake circuits, and wheel brakes in each circuit. The master cylinder generates hydraulic forces in both brake circuits by pressurizing brake fluid when the driver steps on the brake pedal. The pressurized fluid travels through the pressure fluid conduit in both circuits to actuate wheel brakes and slow the vehicle.

Base braking systems typically use a brake booster to provide a force to the master cylinder which assists the pedal force created by the driver. The booster can be vacuum or hydraulically operated.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of ABS. An anti-lock brake system monitors wheel rotational behavior and selectively applies and relieves brake pressure in the corresponding wheel brakes in order to maintain the wheel speed within a selected slip range while achieving maximum braking forces. While such systems are typically adapted to control the braking of each braked wheel of the vehicle, some systems have been developed for controlling the braking of only a portion of the braked wheels.

Electronically controlled ABS valves, comprising apply valves and dump valves, are located between the master cylinder and the wheel brakes and perform the pressure regulation. Typically, when activated, these ABS valves operate in three pressure control modes: pressure apply, pressure dump and pressure hold. The apply valves allow brake pressure into the wheel brakes to increase pressure during the apply mode, and the dump valves open to release pressure from the wheel brakes during the dump mode. Wheel brake pressure is held constant during the hold mode by closing both the dump valves and the apply valves.

A further development in braking technology has led to the introduction of TC systems. Additional valves have been added to existing anti-lock braking systems to provide a braking systems which control wheel speed during acceleration. Excessive wheel speed during vehicle acceleration leads to wheel slippage and a loss of traction. An electronic control system senses this condition and automatically applies braking pressure to the wheel brakes of the slipping wheel to reduce the slippage and increase the traction available. In order to achieve optimal vehicle acceleration, braking pressures greater than the master cylinder pressure must quickly be available when the vehicle is accelerating.

A multiplicity of control valves and hydraulic components are used in ABS/TC systems, and are typically housed in a hydraulic control unit (HCU). The HCU includes a housing having a plurality of bores in which the control valves and hydraulic components are seated. Passageways or conduits are drilled into the HCU to provide fluid communication between the various valves and components.

It is desirable to combine functions of traditional valves and hydraulic components into a single, integrated assembly. Such integrated assemblies reduce the cost of manufacturing the various components and the HCU, and also reduce the size and weight of a ABS/TC system.

BRIEF SUMMARY OF THE INVENTION

A pressure balanced supply valve for use in a vehicular braking system which includes a master cylinder, a pump, and a low pressure accumulator. The supply valve has a housing defining a first chamber, a second chamber, a first fluid conduit for connection to an output of the master cylinder, and a second fluid conduit for connection to an inlet of the pump. The second fluid conduit is in fluid communication with both the first chamber and the second chamber. The housing further defines a third fluid conduit connected between the first fluid conduit and the second fluid conduit. A valve seat is defined in the third fluid conduit. A movable valve element is movable to a first position sealing against the valve seat to prevent fluid flow between the first conduit and the second conduit through the third conduit. The movable valve element is also movable to a second position spaced apart from the valve seat to permit fluid flow between the first conduit and the second conduit through the third conduit. The movable valve element is exposed to pressures in both the first chamber and the second chamber so as to be at least partially pressure balanced in operation. The housing may further integrally incorporate the low pressure accumulator adjacent the supply valve so that operation of the low pressure accumulator elements forces the supply valve movable element away from the seat when the low pressure accumulator is empty.

Various objects and advantages of this invention will become apparent to those skilled in the art from the following detailed description of the preferred embodiment, when read in light of the accompanying drawings.

DETAILED DESCRIPTION OF THE INVENTION

Preliminarily, it should be noted that reference to the included table of reference numbers may facilitate an understanding of the following description and Figures.

Figure 1:
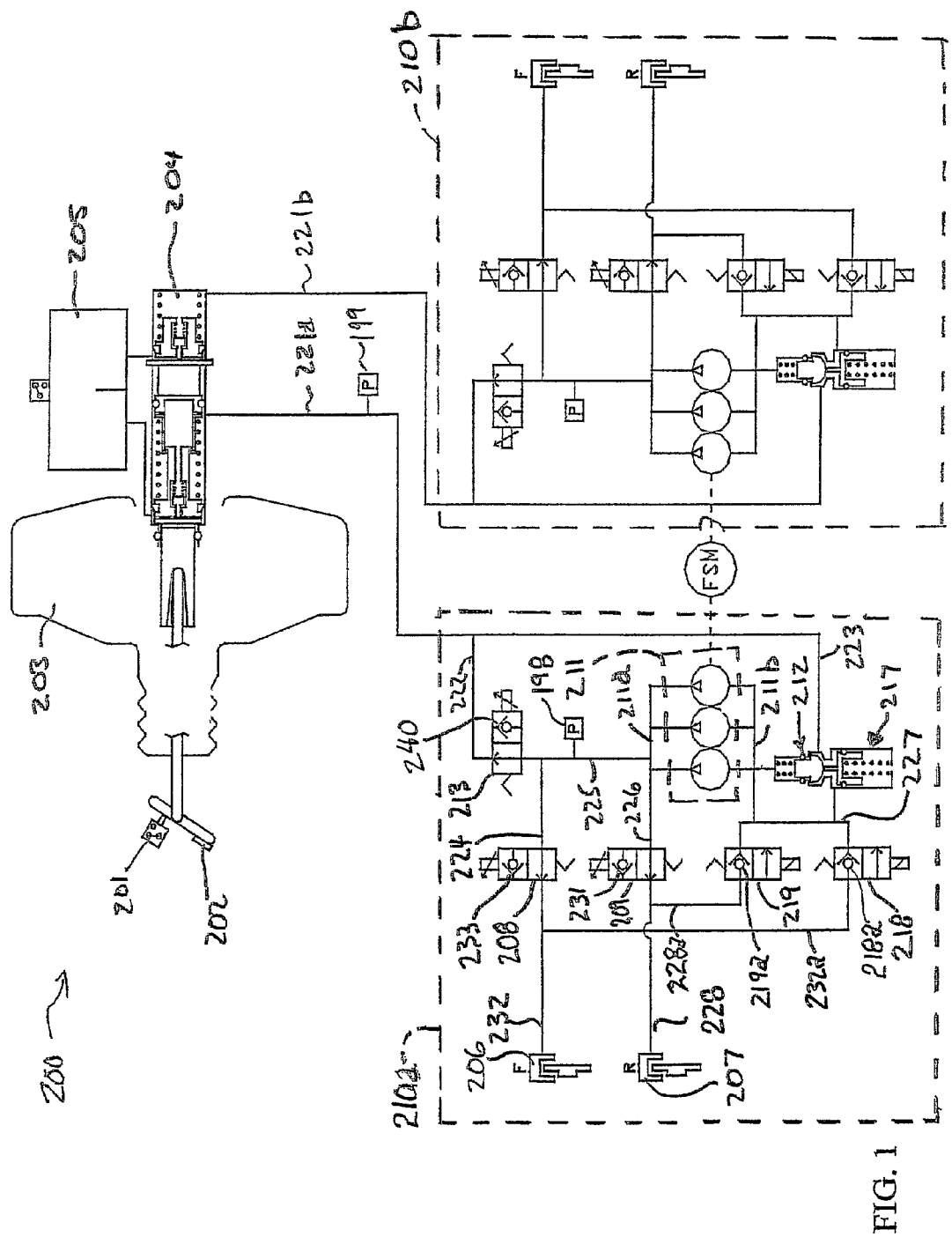
FIG. 1 is a schematic diagram of a vehicular braking system having anti-lock and traction control capabilities and incorporating the supply valve according to the invention.

FIG. 1 illustrates a pedal-isolated ABS/TC braking system 200 according to the invention. A brake pedal 202 is connected to a booster 203 and a tandem master cylinder 204. A brake switch 201 is used to indicate when a driver pushes on the brake pedal 202. A reservoir 205 is connected to the master cylinder 204 and holds a supply of brake fluid, typically at atmospheric pressure. The tandem master cylinder 204 is connected to two similar but separate brake circuits 210a, 210b, via respective fluid conduits 221a and 221b. For ease of description, only the components in circuit 210a will be discussed. The components of circuit 210b can be identical to the components to the circuit 210a. A pressure sensor 199 is connected to the fluid conduit 221a, and develops a pressure signal representative of the output pressure of the master cylinder 204. Absent a failure, the pressure in the fluid conduit 221b should be substantially the same as the pressure in the fluid conduit 221a, and it is believed that one pressure sensor, connected to either the fluid conduit 221a as illustrated, or to the fluid conduit 221b, will be sufficient to provide a useful signal of master cylinder pressure. However, in certain applications, it may be desirable to provide a pressure sensor connected to each of the fluid conduits 221a and 221b, or, indeed, to omit the pressure sensor 199 entirely, and rely instead upon some other process measurement device as an input for control of the brake system 200.

A non-driven wheel brake 206 and a driven wheel brake 207 are connected to the master cylinder 204 via the brake fluid conduit 221a. The conduit 221a is connected to a conduit 222 and a conduit 223. A conduit 225 is connected between the conduit 222 and an outlet 211a of a pump 211. The conduit 223 is connected to an inlet 211b of the pump 211. A pressure sensor 198 is connected to provide a pressure signal representative of the pressure in the fluid conduit 225. A conduit 224 is connected between the conduit 225 and the non-driven wheel brake 206. A conduit 226 is connected between the conduit 225 and the driven wheel brake 207. A pair of two-position, two-way normally open solenoid apply valves 208 and 209 are located in the conduit 224 and the conduit 226, respectively. A supply valve 212 is located in the conduit 223 between the master cylinder 204 and the pump 211.

A two-position, two-way normally open solenoid isolation valve 213 selectively provides fluid communication between the conduit 222 and the conduits 224 and the conduit 226 (via the conduit 225). In the normally open position of the isolation valve 213, fluid can flow in either direction through the isolation valve 213. However, a one-way check valve 240 is located in the isolation valve 213, which, when the isolation valve 213 is moved to the "closed" (or check) position, allows fluid to flow from the master cylinder 204 through the conduit 221a and the conduit 222, through the isolation valve 213 to the conduit 225 supplying the driven wheel brake 207 (via the conduit 226) and the undriven wheel brake 206, but fluid may not flow not in the opposite direction through the isolation valve 213. Suitably, the check valve 240 may be formed as a lip seal within the valve 213. Additionally, under conditions of high differential pressure across the isolation valve 213, that is, when the pressure in the fluid conduit 225 is significantly higher than the pressure in the conduit 222, the isolation valve 213 may be moved to the open position by the differential pressure to relieve the high pressure in the conduit 225 to the master cylinder 204, for a purpose which will be described below.

A conduit 228 is connected to the conduit 226 via the apply valve 209 and to the driven wheel brake 207. When the apply valve 209 is in the open position, fluid can pass in either direction between the conduit 228 and the conduit 226, through the apply valve 209. Thus, when the apply valve 209 is in the open position, fluid can be supplied to the driven wheel brake 207, from the pump 211 through the conduit 226, and through the open apply valve 209; the driven wheel brake 207 can also be supplied from the master cylinder 204, through the conduit 221a and the conduit 222, through the isolation valve 213, through the conduit 225 to the conduit 226, and through the open apply valve 209. A one-way check valve 231 is located in the normally open apply valve 209. When the apply valve 209 is moved to the "closed" (or check) position, the check valve 231 prevents fluid to flow from the conduit 226 to the conduit 228, but the check valve 231 permits flow in the opposite direction (for example, from the driven wheel brake 207, through the conduit 228, the apply valve 209, the conduit 226, the conduit 225, through open isolation valve 213, through the conduit 222, and through the conduit 221a to the master cylinder 204). Suitably, the check valve 231 may be configured as a lip seal within the apply valve 209.

A conduit 232 is connected to the conduit 224 via the apply valve 208 and to the non-driven wheel brake 206. When the apply valve 208 is in the open position thereof, fluid can pass in either direction between the conduit 232 and the conduit 224, through the apply valve 208. Thus, when the apply valve 208 is in the open position thereof, fluid can be supplied to the non-driven wheel brake 206, from the pump 211 through the conduit 225 and the conduit 224, and through the open apply valve 208; the non-drive wheel brake can also be supplied from the master cylinder 204, through the conduit 221a and the conduit 222, through the isolation valve 213 to the conduit 224, and through the apply valve 208. A one-way check valve 233 is located in the normally open apply valve 208. When the apply valve 208 is moved to the "closed" (or check) position, the check valve 233 prevents fluid to flow from the conduit 224 to the conduit 232, but the check valve 233 permits flow in the opposite direction (for example, from the non-driven wheel brake 206, through the conduit 232, the apply valve 208, the conduit 224, through the open isolation valve 213, through the conduit 222, and through the conduit 221a to the master cylinder 204). Suitably, the check valve 233 may be configured as a lip seal within the apply valve 208.

A second fluid conduit 227 is in fluid communication with the pump inlet 211b. A Low Pressure Accumulator (LPA) 217 located at the junction of the conduit 223 and the conduit 227 in a manner which will be described more fully below.

The fluid conduit 227 is also in communication with the conduit 232 via a fluid conduit 232a. A 2-position, 2-way normally closed solenoid dump valve 218 is located in the conduit 232a, between the wheel brakes 206 and the fluid conduit 227. A check valve 218a, preferably formed as a lip seal, is located in the dump valve 218, which permits fluid flow in the direction from the fluid conduit 227 to the fluid conduit 232, but not the other direction, when the dump valve 218 is in the shut position.

The fluid conduit 227 is further in communication with the conduit 228 via a fluid conduit 228a. A 2-position, 2-way normally closed solenoid dump valve 219 is located in the conduit 228a, between the wheel brakes 207 and the fluid conduit 227. A check valve 219a, preferably formed as a lip seal, is located in the dump valve 219, which permits fluid flow in the direction from the fluid conduit 227 to the fluid conduit 228, but not the other direction, when the dump valve 219 is in the shut position.

It should be noted that all the above described solenoid valves 213, 208, 209, 218 and 219 have been described as having a respective check valve located in the valve. Of course, any and all of these check valves may be embodied in any suitable form, including as a separate check valve plumbed in parallel to the associated solenoid valve.

The pump 211 is preferably a six piston pump, as schematically illustrated, with three pistons supplying fluid to the brake circuit 210a and three pistons supplying fluid to the brake circuit 210b. The pistons are preferably sequentially actuated by the same cam, and thus provide a relatively steady flow, with relatively low pulsation in the combined discharge stream of the pump 211 (compared to the operation of a conventional two piston pump), thereby providing relatively quiet operation. It is contemplated that the pump 211 may be provided with fewer (or more) pistons than the illustrated six pistons in certain applications. Regardless of the number of pistons utilized, if chosen configuration of the pump 211 is prone to generating noticeable pressure pulses and noise, known arrangements for damping such pressure pulses (and quieting the noise of operation of the pump 211) may be provided. For example, one or more small diameter orifices (not shown) may be provided in the pump outlet 211a to attenuate pressure pulses produced during operation of the pump 211.

An electric motor FSM is provided to drive the pump 211. Preferably, the motor is a brushless motor. One particular brushless motor which is believed to be suitable is a flux switching motor, such as that being developed at the Centre for Advanced Electronically Controlled Drives, University of Leicester, Leicester, England. A flux switching motor is a combination of a switched reluctance motor and an inductor alternator. However, any suitable motor may be used.

An electronic control unit (ECU) (not shown) is electrically connected to the motor FSM and to each solenoid valve. The ECU is also connected to receive the signals generated by the pressure sensors 199 and 198, and the brake switch 201. The ECU operates the motor FSM to drive the pump 211 and shuttles the appropriate valves when necessary during ABS or TC modes.

As indicated above, the isolation valve 213 will open due to high differential pressure under conditions of relatively high pressure in the conduit 225 and relatively low pressure in the conduit 222. Since the pump outlet 211a is in fluid communication with the fluid conduit 225, in this manner the isolation valve 213 acts as a relief valve for the pump 211. Thus, if the structure of the isolation valve 213 is appropriately configured so that the isolation valve 213 opens at a desired differential pressure, there is no need for a dedicated relief valve connecting, for example, the pump inlet 211b and the pump outlet 211a, though such a dedicated relief valve could be provided if desired.

Figure 2:
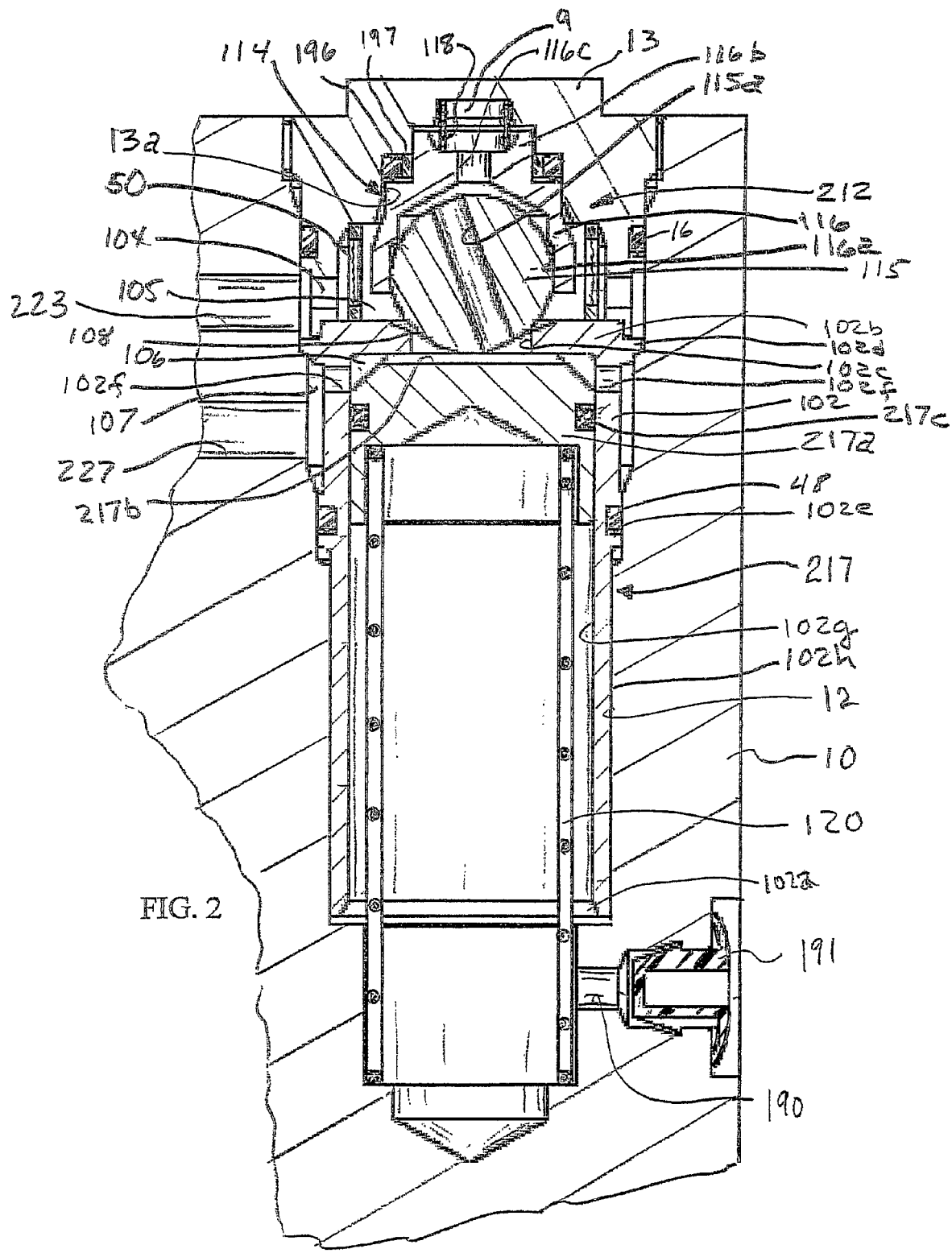
FIG. 2 is a sectional view of a pressure balanced supply valve according to this invention mounted in a hydraulic control unit of the system of FIG. 1.

Referring now to FIG. 2, the supply valve 212 and the LPA 217 are shown in an enlarged cross-sectional view. The supply valve 212 is received in a bore 12 of a Hydraulic Control Unit (HCU) 10 which preferably houses the various components of the system 200 including the isolation valves, the apply valves, the dump valves, the LPA 217, and the pump 211. The HCU 10 is formed as a housing and includes bores for receiving the components and fluid passageways for providing fluid communication between the components. The supply valve 212 is positioned between the LPA 217 at a first end and a sealing disc 13 at a second end. The disc 13 is provided with a cylindrical recess 13a formed in the face of the disc 13 facing the LPA 217. An annular seal 16 is provided between the disc 13 and the HCU 10 to prevent the escape of brake fluid from the bore 12 past the disc 13.

The supply valve 212 includes a generally cylindrical sleeve 102 having an open end 102a and a flanged end 102b. The flanged end 102b has a radially inwardly extending flange defining a central opening 102c, and a valve seat 108 formed about the central opening 102c. A circumferential outwardly extending flange 102d is formed about the sleeve 102 which engages a shoulder on the wall of the bore 12, serving to axially locate the sleeve 102 within the bore 12. A circumferentially-extending groove 102e is formed on an outer surface 102h of the sleeve 102, between the open end 102a and the flange 102d. An o-ring or other suitable seal 48 is disposed in the circumferential groove 102e to seal between the sleeve 102 and the wall of the bore 12. One or more radial openings 102f is formed through the sleeve 102, extending between an inner surface 102g of the sleeve 102 generally radially outwardly to the outer surface 102h.

A movable valve element indicated generally at 114 is disposed between the flanged end 102b of the sleeve 102 and the disc 13. The valve element 114 is illustrated including a ball 115 and a generally cylindrical piston 116. As will be explained further below, the piston 116 cooperates with the HCU 10 to define a first chamber 9 in an end portion of the bore 12, between the piston 116 and the disc 13.

The ball 115 is preferably made of a suitably durable material for the anticipated application; steel is believed to be suitable for many anticipated applications. The ball 115 has a passageway 115a formed therethrough. The ball 115 is pressed into a recess 116a formed in the piston 116, which may be formed of aluminum or other suitable material in an orientation such that the passageway 115a provides fluid communication through the ball 115 into the recess 116a. The piston 116 has a reduced diameter portion 116b formed on an end opposite the end in which the recess 116a is formed. The reduced diameter portion 116b has an outer diameter which is substantially the same as the circle describing the line of contact between the ball and the valve seat 108 about the central opening 102c in the sleeve 102 when the supply valve 212 is shut. The reduced diameter portion 116b is disposed in the recess 13a in the disc 13. A central fluid passageway 116c is formed longitudinally through the reduced diameter portion 116b, and provides fluid communication between the recess 116a and the first chamber 9 formed between the piston 116 and the disc 14.

A cylindrical filter 50 is disposed between the flanged end 102b of the sleeve 102 and the disc 13. The filter 50 has a circular seal against the disc 13 at one longitudinal end of the filter 50. The filter 50 has a circular seal against the flanged end 102b, about the central opening 102c, at the other longitudinal end of the filter 50. The filter 50 divides the area between the flanged end 102b and the disc 13 into a second chamber 105 inside the filter 50 (between the movable valve element 114 and the valve seat 108) and an annular third chamber 104 abut the outside of the filter 50. The central opening 102c in the flanged end 102b forms a passageway providing fluid communication between the second chamber 105 and a fourth chamber, the LPA chamber 106, inside the cylindrical sleeve 102, with the seat 108 about the opening 102c defining the intersection of the chamber 105 and the LPA chamber 106. The radial opening 102f provides fluid communication between the LPA chamber 106 inside the cylindrical sleeve 102 and an annular fifth chamber 107 formed about the sleeve 102 between the circumferential groove 102e and the flange 102d. The fifth chamber 107 is in fluid communication with the fluid conduit 227, and thus is in fluid communication with the dump valves 218, 219 and the pump inlet 211b.

The fluid conduit 227 is in continuous fluid communication with the first chamber 9 via the fifth chamber 107, the radial opening 102f, the fourth chamber 106, the central opening 102c, the passageway 115c and the central fluid passageway 116c. This is schematically illustrated in FIG. 1 by the connection of the conduit 227 on two sides of the supply valve 212. Indeed, while this connection between the first chamber 9 and the fluid conduit 227 is internal to the supply valve 212 (via the passageway 115c) in the embodiment illustrated in FIG. 2, as will be seen in the embodiment illustrated in FIG. 3, this connection could actually be external to the supply valve 212.

The third chamber 104 is in fluid communication with the fluid conduit 223, and thus is in fluid communication with the master cylinder 204.

A spring 118 is disposed in the chamber 9. The spring 118 acts between the disc 13 and the piston 116 to urge the ball 115 of the valve element 114 toward the valve seat 108.

A low friction seal 197 made of a suitable material, such as polytetrafluoroethylene, sealingly engages the radially outer surface of the reduced diameter portion 116b. The seal 197 is energized by an encircling o-ring 196, which seals to both the seal 197 and the inner wall of the cylindrical recess 13a in the disc 13.

The LPA 217 includes a movable pressure boundary element. The movable pressure boundary element moves to change the volume of the LPA 217 as the LPA 217 fills and empties. In the preferred embodiment illustrated in FIG. 2, the movable pressure boundary element is embodied as an LPA piston 217a disposed within the cylindrical sleeve 102. However the movable pressure boundary element could be any suitable element, such as a movable diaphragm, or collapsible bladder. The LPA piston 217a has one or more grooves 217b formed in the face thereof to provide fluid communication between the radial openings 102f in the sleeve 102 and the central opening 102c in the flanged end 102b of the sleeve 102, even when the LPA piston 217a contacts the flanged end 102b. A seal 217c is disposed in a circumferential groove in the outer surface of the LPA piston 217a, and provides a sliding seal between the LPA piston 217a and the inner surface 102g of the sleeve 102. The LPA 217 further includes a spring 120 acting between the closed end of the bore 12 and the LPA piston 217a. The spring 120 acts to urge the LPA piston 217a toward the flanged end 102b of the sleeve 102, and to thus minimize the volume of the chamber 106.

When the LPA 217 is empty, the LPA piston 217a is disposed in contact with the flanged end 102b of the sleeve 102, as illustrated in FIG. 2. The LPA piston 217a also contacts the ball 115, moving the ball 115 off of the seat 108, so that the supply valve 212 is in the open position. In the illustrated normally open position of the supply valve 212, fluid may travel between the LPA chamber 106 and the second chamber 105. As fluid enters the LPA 217, and more specifically, accumulates in the chamber 106, the LPA piston 217a is displaced downwardly (with reference to the orientation of FIG. 2), allowing the valve element 114 to move downwardly, until the ball 115 seals against the seat 108, closing the supply valve 212.

The bore 12, between the LPA piston 217a and the closed end of the bore 12, is vented to atmosphere via a conduit 190, in which a dust cap 191 is disposed.

During a base brake apply the master cylinder 204 pressurizes brake fluid when the driver pushes the brake pedal 202. Pressurized fluid flows from the master cylinder 204 through conduits 221a, 222, and 225, through the apply valve 208 and the conduit 232 into the non-driven wheel brake 206. Pressurized fluid also flows to the driven wheel brake 207 from the conduit 225 through the conduit 226, the apply valve 209, and the conduit 228. The pressurized brake fluid reaching the wheel brakes 206 and 207 applies the brakes and slows the vehicle. Pressurized fluid passes through the fluid conduit 223 and the supply valve 212, and into the LPA 217. Since the pump 211 is not run in the base brake mode, the fluid begins to accumulate in the chamber 106, moving the LPA piston 217a away from the flanged end 102b as the chamber 106 expands. This closes the supply valve 212 after only a very small amount of fluid enters the LPA 217, thereby preventing pressurized fluid from reaching the pump inlet 211b, or any further fluid accumulation in the LPA 217.

It will be appreciated that the chamber 9 is vented through the passageway 115a through the ball 115 to the chamber 106, and from there via the conduit 227 to the pump inlet 211b. It should also be appreciated that the valve element 114 is substantially pressure balanced, since the pressures in the first chamber 9 and the second chamber 105 at each end of the valve element 114 are generally equalized through the passageway 115a. Since the reduced diameter portion 116b of the valve element 114 is of substantially the same diameter as the diameter of the line of contact between the ball 115 and the seat 108, the areas over which these equalized pressures act are substantially the same, so that the pressure forces acting on the valve element 114 are generally equal and opposite in direction. This enables the supply valve 212 to be formed with a relatively large diameter central opening 102c within the seat 108, and yet have relatively small operating forces requirements (i.e., less spring force is required to lift the movable valve element 114 off the valve seat 108). While in a preferred embodiment the reduced diameter portion 116b of the valve element 114 is of substantially the same diameter as the inner diameter of the seat 108, it is recognized that it may be desirable in certain circumstances to have the reduced diameter portion 116b of the valve element 114 be of a somewhat different diameter than the inner diameter of the seat 108, so that there is not complete pressure balancing, but merely partial pressure balancing. Such an arrangement achieving only partial pressure balancing is considered to be within the scope of the invention.

When the brake pedal 202 is released, the master cylinder 204 no longer pressurizes the brake fluid, thus reducing the pressure at the wheel brakes 206 and 207. The reduction in brake pressure causes the fluid to return back to the master cylinder 204 and reservoir 205 through the open apply valves 208, 209, and the isolation valve 213. More specifically, pressurized fluid at the non-driven wheel brake 206 returns through the conduit 232, the open apply valve 208, the conduit 224, the open isolation valve 213, the conduit 222, and the conduit 221a. Pressurized fluid at the driven wheel brake 207 returns through two paths. The first path includes the conduit 228, the open apply valve 209, the conduit 226, the conduit 225, the valve 213, the conduit 222, and the conduit 221a.

During an ABS event, a dump mode is utilized to reduce pressure in the wheel brake of the slipping wheel. In the base braking mode at the beginning of a ABS dump mode, the supply valve 212 is closed and the isolation valve 213 is open. Beginning the ABS dump mode, the ECU closes the solenoid-operated apply valves 208 and 209. The solenoid-operated dump valve 218, 219 corresponding to the wheel brake 206, 207 of the slipping wheel is shuttled open. The pressurized fluid from the brake 206, 207 of the slipping wheel flows through the associated dump valve 218, 219 and into the LPA 217. The ECU also energizes the motor FSM to drive the pump 211, which runs continuously during an ABS event.

In an ABS hold mode, the pressure at the wheel brakes 206, 207 is held constant. The valves 212 and 213 remain closed and open, respectively. The apply valves 208 and 209 remain closed and the open dump valves 218, 219 are also shuttled closed by the ECU. The pump 211 runs, pumping fluid from LPA back to the LPA via the Traction Control Isolation valve 213 and the conduit 223.

When the affected wheel has reached a predetermined slip level, the braking system 200 enters an ABS apply mode to begin braking the affected wheel again. In an ABS apply mode, the supply valve 212 remains closed, and the isolation valve 213 is open. The apply valves 208, 209 corresponding to the affected wheel is pulsed open to apply pressurized fluid to the affected wheel brake 206, 207. The apply valve 208, 209 is pulsed open and closed increasing the pressure until the pressures in all of the affected wheel brakes are equalized with the master cylinder pressure concluding the ABS event or the wheel slips again and ABS dump mode is entered again to repeat the cycle.

When the driven wheel begins to slip during acceleration, a Traction Control (TC) event occurs and braking pressure is applied to the slipping wheel. In a TC event, the ECU energizes the motor FSM which drives the pump 211. Typically, the driver does not apply the brakes while accelerating and the supply valve 212 remains open during traction control (with the LPA piston 217 in the empty LPA 217 urging the ball 115 off of the seat 108 to open the flow path). The pump 211 draws fluid from the master cylinder 204 and the reservoir 205 through the open supply valve 212 via the conduit 221a and the conduit 223. The isolation valve 213 is closed by the ECU to isolate the pressurized fluid from the pump 211 at the driven wheel brake. The check valve 240 isolates the pump pressure from the master cylinder 204 preventing the pressure pulses from reaching the master cylinder 204. The pump outlet 211a communicates with the driven wheel brake 207 through the line 226 and the open apply valve 209. The dump valves 218, 219 are closed. The apply valve 209 controls the flow of pressurized fluid into the affected wheel brake until the proper driven wheel speed is obtained.

A TC hold mode isolates fluid pressure at the driven wheel brake by closing the driven wheel apply valve 209 and keeping the dump valve 219 closed. The valves 208 and 213 continue to be actuated to the closed position Pressure is relieved in the driven wheel brake 207 to decrease the braking force on the driven wheel during a TC dump mode. The driven wheel apply valve 209 is closed while the dump valve 219 is shuttled open, allowing the excess fluid to return to the master cylinder 204 and the reservoir 205 via the conduit 223 and the conduit 221a.

Figure 3:
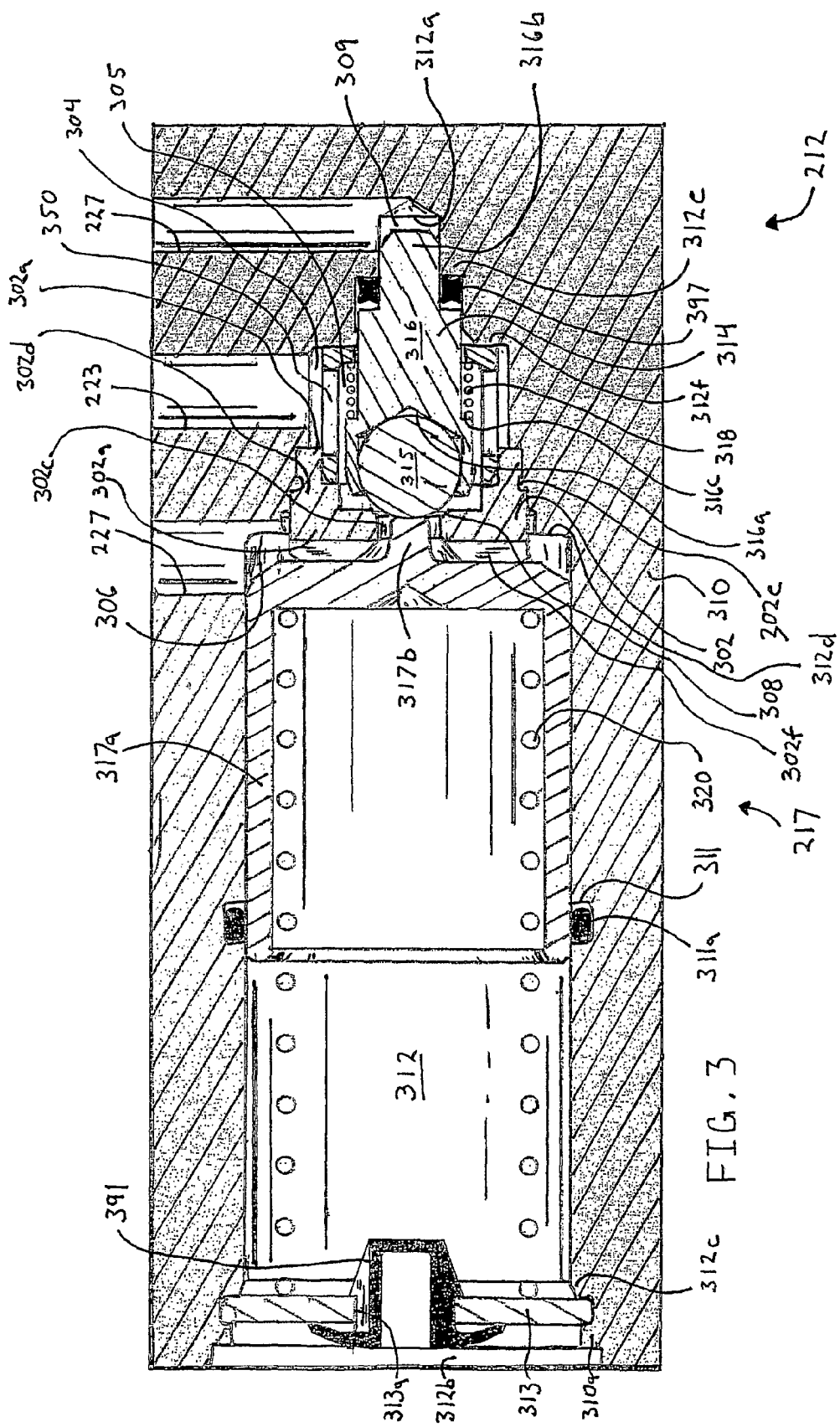
FIG. 3 is a sectional view of an alternate embodiment of a pressure balanced supply valve according to this invention.

Referring now to FIG. 3, there is illustrated a second embodiment of the supply valve 212 and a second embodiment of the LPA 217. In the following discussion of these second embodiments, the supply valve 212 and the LPA 217 retain the same operational purpose, and somewhat similar operation. Accordingly, components of these second embodiments will have somewhat similar reference numbers (except beginning with a "3") to components of the first embodiments when these components generally have similar structure and function.

In the second embodiment, the supply valve 212 and the LPA 217 are housed in an HCU 310. The HCU 310 is formed of any suitable material; it is anticipated that the HCU 310 may be advantageously formed of aluminum. The HCU 310 includes a bore 312 having a first end 312a in the interior of the HCU 310 and a second end 312b forming an opening in the exterior surface of the HCU 310.

As will be appreciated by reference to FIG. 3, the bore 312 is not of constant diameter, but rather is stepped inwardly between the second end 312b and the first end 312a to form several shoulders, including a first shoulder 312c, a second shoulder 312d, and a third shoulder 312e. A fourth shoulder 312f is formed between the second shoulder 312d and the third shoulder 312e. The purposes of the shoulders 312c-312f will be described below. Additionally, a circumferentially extending groove 311 is formed in the wall of the bore 312 between the first shoulder 312c and the second shoulder 312d. A static seal 311a (such an o-ring) is disposed in the groove 311, the purpose of which will be described below.

The HCU 310 further defines at least portions of the fluid conduits 227 and 223. The fluid conduit 227 communicates with the bore 312 in a first location at the first end 312a of the bore 312, and in a second location between the first shoulder 312c and the second shoulder 312d (adjacent the second shoulder 312d). The fluid conduit 227 provides continuous fluid communication between these first and second locations of communication with the bore 312 via a path through a portion of the HCU 310 not illustrated in FIG. 3, though this connection is schematically illustrated in FIG. 1. The fluid conduit 223 communicates with the bore 312 between the second shoulder 312d and the third shoulder 312e.

A retaining disc 313 is fixed in the second end 312b of the bore 312, abutting the first shoulder 312. After the components of the supply valve 212 and the LPA 217 are assembled in the bore 312, the retaining disc 313 is fixed in place by any suitable method, such as by deforming a portion of the HCU 310 to form a flange 310a holding the retaining disc 313 against the first shoulder 312. An opening 313a is formed through the retaining disc 313, venting the bore 312 to atmosphere.

A helical spring 320 is disposed in the bore 312. A first end of the spring 320 bears against the retaining disc 313. The second end of the spring 320 is compressed against a piston 317a, which forms the movable pressure boundary of the LPA 217. The piston 317a is preferably formed as a cup-shaped component, with a portion of the spring 320 being disposed within the open end of the piston 317a. The piston 317a is slidingly sealed to the HCU 310 by the static seal 311a. The closed end of the piston 317a is provided with a protrusion 317b extending axially outwardly from the closed end of the piston 317a toward the first end 312a of the bore 312, the purpose of which will be described below. The piston 317a is formed of any suitable material; it is believed that an especially suitable material is hard anodized aluminum, which has good resistance to wear caused by sliding engagement with the seal 311a. In contrast the HCU 310 can be formed of relatively softer material (softer, non-anodized aluminum, for example, since there is little or no relative movement between the static seal 311a and the HCU 310.

A generally cylindrical sleeve 302 is fixed in the bore 312 between the piston 317a and the first end 312a of the bore 312. The sleeve 302 is generally cup-shaped, having an open end 302a opening toward the first end 312a of the bore 312, and a flanged end 302b. The flanged end 302b has an inwardly extending flange defining a central opening 302c. The flanged end 302b also has a slightly outwardly extending circumferential flange 302d. A circumferentially extending groove 302e is formed on the exterior surface of the sleeve 302. When the sleeve 302 is assembled into the bore 312, the sleeve 302 is pressed into engagement with the second shoulder 312d, which has a diameter slightly greater than the diameter of the open end 302a of the sleeve 302, and slightly less than the diameter of the outwardly extending flange 302d. As the sleeve 302 is pressed into place, metal from the shoulder 312d is deformed into the groove 302e by the flange 302d, thereby fixing the sleeve 302 in place with a fluid tight seal to the HCU 310. The sleeve 302 has one or more radially extending grooves 302f formed in an axial end face adjacent the LPA piston 317a. The grooves 302f prevent the LPA piston 317a from sealing against the sleeve 302, and provide a fluid path between the central opening 302c and the fluid conduit 227 at the second location where the fluid conduit 227 communicates with the bore 312.

The spring 312 urges the LPA piston 317a toward the sleeve 302, specifically toward a position in which the LPA piston 317a contacts the axial end face of the sleeve 302 adjacent the LPA piston 317a, and the protrusion 317b extends into the opening 302c. The opening 302c in the sleeve 302 has a diameter greater than the protrusion 317b on the LPA piston 317a, so that fluid can flow between the opening 302c and the grooves 302f even when the protrusion 317b is disposed in the opening 302c. The sleeve 302 forms the boundary between the LPA 217 and the supply valve 212.

A valve seat 308 is formed on the sleeve 302 about the opening 302c, on the side of sleeve facing the first end 312a of the bore 312. A movable valve element 314 is disposed between the sleeve 302 and the first end 312a of the bore 312. The movable valve element 314 is formed of a ball 315 and a piston 316. The piston 316 has a recess 316a formed in an axial end face, in which the ball 315 is partially disposed. The ball 315 is fixed in the recess 316a, preferably by crimping the cylindrical walls of the recess 316a inwardly to retain the ball 315. The recess 316a is formed in a relatively large diameter portion of the piston 316. The piston 316 has a reduced diameter portion 316b, which extends toward the first end 312a of the bore 312, past the third shoulder 312e. The piston 316 also has an outwardly extending circumferential flange 316c, the purpose of which will be discussed below.

A seal 397 is disposed about the reduced diameter portion 316b, abutting the third shoulder 312, to provide a fluid tight seal between the piston 316 and the HCU 310, while permitting the movable valve element 314 to move axially in the bore 312. The seal 397 may be formed of any suitable material in any suitable manner; one suitable arrangement is that the seal 397 is a quad seal.

A first chamber 309 is formed between the piston 316 and the inner end of the bore 312, communicating with the conduit 227 at the first location where the conduit 227 communicates with the bore 312.

A cylindrical filter 350 is disposed about the movable valve element 314. The filter 350 has a circular seal against the fourth shoulder 312f at one longitudinal end of the filter 350. The filter 350 has a circular seal against the sleeve 302, about the central opening 102c, at the other longitudinal end of the filter 350. The filter 350 divides the area between the fourth shoulder 312f and the sleeve 302 into a second chamber 305 inside the filter 350 (between the movable valve element 314 and the valve seat 308) and an annular third chamber 304 about the outside of the filter 350.

A fourth chamber 306 is the LPA chamber inside the bore 312 in the HCU 10, defined between the LPA piston 317a and the sleeve 302. The fourth chamber 306 is in fluid communication with the fluid conduit 227 at the second location where the fluid conduit 227 communicates with the bore 312. The fourth chamber 306 is in constant communication with the first chamber 307 via the fluid conduit 227. The diameter of the reduced diameter portion 316b of the piston 316 at the seal 397 is preferably the same the diameter of the circle of contact between the ball 315 and the valve seat 308 formed about the opening 302c. Thus, since the pressure in the fourth chamber 306 acting on the movable element 314 is the same as the pressure in the first chamber 309 acting on the movable element 314, and acts on equal areas, the movable element 314 is substantially pressure balanced, reducing the force required of the spring 320 to lift the movable element 314 off the valve seat 308. As with the first embodiment shown in FIG. 2, while in a preferred embodiment the reduced diameter portion 316b of the valve element 314 is of substantially the same diameter as the valve seat 308, it is recognized that it may be desirable in certain circumstances to have the reduced diameter portion 316b of the valve element 314 be of a somewhat different diameter than the inner diameter of the seat 308, so that there is not complete pressure balancing, but merely partial pressure balancing. Such an arrangement achieving only partial pressure balancing is considered to be within the scope of the invention.

A spring 318 is disposed about the piston 316, within the filter 350. The spring 318 is compressed between the flange 316c on the piston 316 and an inwardly extending flange of the filter 350 butting up against the fourth shoulder 312f. The spring 318 acts to urge the movable valve element 314 toward the sleeve 302, so that the ball 315 sealingly engages the valve seat 308, to prevent fluid flow through the opening 302c through the sleeve 302. However, when the LPA piston 317a is fully advanced by the spring 320 into contact with the sleeve 302, the protrusion 317b extends sufficiently far through the opening 302c to contact the ball 315 and prevent the ball 315 from sealing against the valve seat 308, as shown in FIG. 3. When the LPA 217 has fluid in it, however, the LPA piston 317a is moved away from the sleeve 302, and the protrusion 317b is moved out of the opening 302c, allowing the spring 318 to move the ball 315 into sealing engagement with the valve seat 308. Note that the spring 320 exerts more force than the spring 318 when these two springs are in opposition.

The overall operation of the braking system 200 when provided with the second embodiment of the supply valve 212 and LPA 217 illustrated in FIG. 3 is unchanged from that discussed with respect to the first embodiment shown in FIG. 2. More specifically, during an ABS event, a dump mode is utilized to reduce pressure in the wheel brake of the slipping wheel. In the base braking mode at the beginning of a ABS dump mode, the supply valve 212 is closed and the isolation valve 213 is open. Beginning the ABS dump mode, the ECU closes the solenoid-operated apply valves 208 and 209. The solenoid-operated dump valve 218, 219 corresponding to the wheel brake 206, 207 of the slipping wheel is shuttled open. The pressurized fluid from the brake 206, 207 of the slipping wheel flows through the associated dump valve 218, 219 and into the LPA 217. The ECU 229 also energizes the motor FSM to drive the pump 211, which runs continuously during the ABS braking operation.

In an ABS hold mode, the pressure at the wheel brakes 206, 207 is held constant. The supply valve 212 and the isolation valve 213 remain closed and open, respectively. The apply valves 208 and 209 remain closed and the open dump valves 218, 219 are also shuttled closed by the ECU 229.

When the affected wheel has reached a predetermined slip level, the braking system 200 enters an ABS apply mode to begin braking the affected wheel again. In an ABS apply mode, the supply valve 212 remains closed, and the isolation valve 213 is open (with the protrusion 317b of the LPA piston 317a in the empty LPA 217 urging the ball 315 off of the seat 308 to open the flow path). The pump 211 draws fluid from the master cylinder 204 and the reservoir 205. The apply valve 208, 209 corresponding to the affected wheel is pulsed open to apply pressurized fluid to the affected wheel brake 206, 207. The apply valve 208, 209 is pulsed open and closed increasing the pressure until the pressures in all of the affected wheel brakes are equalized with the master cylinder pressure concluding the ABS event or the wheel slips again and ABS dump mode is entered again to repeat the cycle.

When the driven wheel begins to slip during acceleration, a Traction Control (TC) event occurs and braking pressure is applied to the slipping wheel. In a TC event, the ECU energizes the motor FSM which drives the pump 211. Typically, the driver does not apply the brakes while accelerating and the supply valve 212 remains open during traction control. The pump 211 draws fluid from the master cylinder 204 and the reservoir 205 through the open supply valve 212 via the conduit 221a and the conduit 223. The isolation valve 213 is shuttled closed by the ECU to isolate the pressurized fluid from the pump 211 at the driven wheel brake. The check valve 240 isolates the pump pressure from the master cylinder 204 preventing the pressure pulses from reaching the master cylinder 204. The pump outlet 211a communicates with the driven wheel brake 207 through the line 226 and the open apply valve 209. The dump valves 218, 219 are closed. The apply valve 209 controls the flow of pressurized fluid into the affected wheel brake until the proper driven wheel speed is obtained.

A TC hold mode isolates fluid pressure at the driven wheel brake by closing the driven wheel apply valve 209 and keeping the dump valve 219 closed. The valves 208 and 213 continue to be actuated to the closed position Pressure is relieved in the driven wheel brake 207 to decrease the braking force on the driven wheel during a TC dump mode. The driven wheel apply valve 209 is closed while the dump valve 219 is shuttled open, allowing the excess fluid to return to the master cylinder 204 and reservoir 205 via the conduit 223 and the conduit 221a.

The principle and mode of operation of this invention have been described and illustrated in its preferred embodiment. However, it must be understood that this invention may be practiced otherwise than as specifically explained and illustrated without departing from its spirit or scope.

What is claimed is:

1. A vehicular brake system for providing at least one of (i) traction control functions and (ii) vehicle stability control functions, the brake system including:
    a master cylinder having an output line connected thereto to supply pressurized brake fluid to vehicle brakes,
    a pump having a pump inlet, and
    a low pressure accumulator (LPA)/supply valve assembly, the LPA/supply valve assembly including an LPA reservoir connected to the pump inlet and configured to allow fluid flow both to and from the LPA reservoir and the pump inlet, the LPA/supply valve assembly defined in part by an LPA piston, a supply valve for controlling fluid flow between the master cylinder output line and the pump inlet, the supply valve coupled to the LPA piston and operable to move to an open position to connect the master cylinder output line to the pump inlet when the volume of the LPA reservoir falls below a predetermined amount, wherein the supply valve includes an axially moveable valve element having one end which functions to open a supply passageway connecting the master cylinder output line to a pump inlet line, and having an opposite end exposed to fluid pressure when the valve is open to thereby at least partially pressure balance the moveable valve element.

2. The brake system according to claim 1, wherein the opposite end of the supply valve is exposed to fluid pressure in the pump inlet line when the valve is open to thereby at least partially pressure balance the moveable valve element.

3. The brake system according to claim 1, wherein the moveable valve element is in a closed position to block fluid flow through the supply passageway when the volume of the LPA reservoir is above the predetermined amount.

4. The brake system according to claim 1, wherein when the supply valve is opened, the pump inlet pulls brake fluid exclusively from the master cylinder via the master cylinder output line.

5. The brake system according to claim 1, wherein the moveable valve element is substantially pressure balanced.

6. The brake system according to claim 1, wherein the LPA piston moves the moveable valve element to the open position.

7. The brake system according to claim 1, wherein a valve seat is defined between the supply valve and the LPA reservoir, and wherein a spring biases the moveable valve element against the seat.

8. The brake system according to claim 1, wherein the moveable valve element includes a ball.

9. The brake system according to claim 1, wherein the moveable valve element includes a piston.

10. The brake system according to claim 1, wherein the moveable valve element includes a ball fixed to a piston.

11. The brake system according to claim 1, wherein the moveable valve element has a passageway formed therethrough, through which fluid may flow between the one end of the moveable valve element and the opposite end of the moveable valve element.

12. The brake system according to claim 1, wherein the LPA/supply valve assembly is disposed in a housing, and wherein fluid communicates between the one end of the moveable valve element and the opposite end of the moveable valve element through a passageway formed through the housing.

13. The brake system according to claim 1, wherein a valve seat is defined between the supply valve and the LPA reservoir, wherein the opposite end of the moveable valve element defines a first portion having a first diameter exposed to pressurized fluid in the pump inlet line, and the one end of the moveable valve element defines a second portion adapted to seal against the valve seat along a circle of contact having a diameter substantially equal to said first diameter to thereby substantially pressure balance the moveable valve element.

14. A vehicular brake system for providing traction control and/or vehicle stability control functions, the brake system including:
    a master cylinder having an output line connected thereto to supply pressurized brake fluid to vehicle brakes,
    a pump having a pump inlet, and
    a low pressure accumulator (LPA)/supply valve assembly, the LPA/supply valve assembly including an LPA reservoir connected to the pump inlet and configured to allow fluid flow both to and from the LPA reservoir and the pump inlet, the LPA/supply valve assembly defined in part by an LPA piston, a supply valve for controlling fluid flow between the master cylinder output line and the pump inlet, the supply valve coupled to the LPA piston and operable to move to an open position to connect the master cylinder output line to the pump inlet when the volume of the LPA reservoir falls below a predetermined amount, wherein when the supply valve is opened, the pump inlet pulls brake fluid exclusively from the master cylinder output line.

\* \* \* \* \*